United States Patent
Inamori et al.

(10) Patent No.: US 8,127,872 B2
(45) Date of Patent: Mar. 6, 2012

(54) TRANSMISSION DEVICE FOR WORK VEHICLE

(75) Inventors: Takuya Inamori, Izumi (JP); Hisao Mukai, Sakai (JP); Yushi Matsuzaki, Sakai (JP); Susumu Umemoto, Nara (JP); Akiyoshi Ono, Izumi (JP); Akira Hiwatashi, Sakai (JP)

(73) Assignee: Kubota Corporation, Osaka (JP)

( * ) Notice: Subject to any disclaimer, the term of this patent is extended or adjusted under 35 U.S.C. 154(b) by 279 days.

(21) Appl. No.: 12/569,150

(22) Filed: Sep. 29, 2009

(65) Prior Publication Data
US 2010/0242637 A1 Sep. 30, 2010

(30) Foreign Application Priority Data

Mar. 30, 2009 (JP) ................................ 2009-082756
Mar. 30, 2009 (JP) ................................ 2009-082758

(51) Int. Cl.
*B60K 17/28* (2006.01)
(52) U.S. Cl. .......................................... 180/53.4; 74/11
(58) Field of Classification Search ........ 180/53.4–53.6, 180/53.61, 53.62, 53.8; 74/11, 15.4, 15.82, 74/15.84, 15.86, 473.21
See application file for complete search history.

(56) References Cited

U.S. PATENT DOCUMENTS

| | | | | |
|---|---|---|---|---|
| 6,250,414 | B1 * | 6/2001 | Sato et al. ...................... | 180/307 |
| 6,571,894 | B2 * | 6/2003 | Ishimaru et al. ............. | 180/53.4 |
| 6,616,559 | B1 | 9/2003 | Hori et al. | |
| 6,722,464 | B2 * | 4/2004 | Nakatani et al. .............. | 180/305 |
| 7,421,917 | B2 * | 9/2008 | Nishino et al. .................... | 74/11 |
| 7,854,281 | B2 * | 12/2010 | Maezawa et al. ............ | 180/53.6 |
| 2006/0260302 | A1 | 11/2006 | Sakikawa | |

FOREIGN PATENT DOCUMENTS

| | | |
|---|---|---|
| JP | 63-107236 | 7/1988 |
| JP | 2000-127781 | 5/2000 |
| JP | 2001-180315 | 7/2001 |
| JP | 2006-161979 | 6/2006 |
| JP | 2006-329213 | 12/2006 |
| JP | 2008-137436 A | 6/2008 |

\* cited by examiner

*Primary Examiner* — Paul N Dickson
*Assistant Examiner* — Robert A Coker
(74) *Attorney, Agent, or Firm* — The Webb Law Firm

(57) ABSTRACT

A transmission device for a work vehicle, comprising a travel drive system for transmitting engine power to a travel device; an implement drive system for transmitting engine power to an external power take-off shaft; braking operation tools for a braking operation; a stop operation mechanism provided to the travel drive system and capable of interrupting the transmission of power to the travel device; and a hydraulically operated PTO clutch for interrupting the transmission of power to the external power take-off shaft, the PTO shaft being provided to the implement drive system; wherein
the stop operation mechanism and the PTO clutch are linked with the braking operation tools so that the stop operation mechanism is operated to a power transmission stopping position and the PTO clutch is disengaged along with a pressing operation of the braking operation tools, and the PTO clutch is engaged along with a press-releasing operation of the braking operation tools; and an operation timing is set so that the PTO clutch is disengaged after traveling is detected to have stopped when the braking operation tools are operated in the pressing direction, and that the PTO clutch is engaged before traveling is started when the braking operation tools are operated in the press-releasing direction.

15 Claims, 11 Drawing Sheets

TRANSMISSION DEVICE FOR WORK VEHICLE

BACKGROUND OF THE INVENTION

The present invention relates to a transmission device for a work vehicle comprising a transmission device of a travel drive system for transmitting engine power to a travel device, and also comprising a transmission device of an implement drive system for transmitting engine power to an external power take-off shaft, and further comprising braking operation tools for stopping the traveling of the vehicle body.

Devices having the structure described below have been known in conventional practice as this type of transmission device for a work vehicle.

Specifically, brake pedals as the braking operation tools are pressed, bringing a speed change device for traveling to a stopped state, and a PTO clutch of the implement drive system is operated in a disengaging direction so as to stop the driving of a PTO shaft as well. In the known example of a transmission device for a work vehicle, when tilling work is then restarted, the PTO clutch is automatically engaged when the brake pedals are slightly released while braking remains in effect, and the rotary tiller starts to slowly rotate. When the rotating rotary tiller is lowered into the field being cultivated and is moved to the desired plowing depth, the brake pedals are returned further, braking is completely released, and forward travel can continue at the desired plowing depth (for example, see Japanese Laid-open Patent Application No. 2008-137436 (paragraph nos. 0028, 0029, 0035, 0037, and FIGS. 3 and 4)).

SUMMARY OF THE INVENTION

When using this conventional structure for tilling work in which a rotary tiller is connected to the rear part of a tractor frame and is driven by a PTO shaft, for example, in cases in which traveling is stopped during the tilling work, the PTO clutch is automatically disengaged after the brake pedal is pressed and a travel-stopping operation has been performed. Therefore, this structure is advantageous in that it is possible to avoid instances in which the tractor frame is pushed by the rotatably driven rotary tiller and the stopping distance increases.

When work is then restarted, the PTO clutch is automatically engaged while the brake pedals are returned only slightly and are operated so that the state of stopped travel is maintained, allowing forward travel to be continued after the rotary tiller is lowered to the desired plowing depth. Therefore, additional benefits include that there is no need for a separate speed-changing operation even when work is restarted from the end of the field being cultivated, tilling work can be performed at the desired plowing depth from the start merely by operating the brake pedals, and tillage residue can be reduced.

The conventional structure described above is configured so that the brake pedals and the PTO clutch are linked and the PTO clutch is automatically disengaged in accompaniment with the operation of the brake pedals, but due to an incline in the field being cultivated, the effects of the traveling speed of the vehicle body, and other factors, there are cases in which the timing at which the vehicle body is stopped and the timing at which the PTO clutch is disengaged are not necessarily correlated so that the clutch disengages after the vehicle body stops.

The resulting drawback is that when the PTO clutch is disengaged before a vehicle body having a rotary tiller stops, or when the vehicle body starts to travel before the PTO clutch is engaged, a large amount of tillage residue remains in the cultivated field, making subsequent processing work troublesome, and there is room for improvement in this regard.

Particularly, since the time disparity between the timing at which the vehicle body is stopped and the timing at which the PTO clutch is disengaged is reduced if the brake pedals are rapidly pressed or released from being pressed all at once, there is a danger of a greater possibility that there will be a reversal of the timing at which either the PTO clutch disengages after the vehicle body stops or the vehicle body starts traveling after the PTO clutch engages.

An object of the present invention is to ensure that the PTO clutch is reliably disengaged after the vehicle body stops traveling, and that the stopped travel is released after the PTO clutch is engaged, when a PTO clutch is automatically engaged and disengaged by operating brake pedals to stop the traveling of a vehicle body.

A transmission device for a work vehicle of the present invention comprises a travel drive system for transmitting engine power to a travel device; an implement drive system for transmitting engine power to an external power take-off shaft; braking operation tools for a braking operation; a stop operation mechanism provided to the travel drive system and capable of interrupting the transmission of power to the travel device; and a hydraulically operated PTO clutch for interrupting the transmission of power to the external power take-off shaft, the PTO shaft being provided to the implement drive system; wherein the stop operation mechanism and the PTO clutch are linked with the braking operation tools so that the stop operation mechanism is operated to a power transmission stopping position and the PTO clutch is disengaged along with a pressing operation of the braking operation tools, and the PTO clutch is engaged along with a press-releasing operation of the braking operation tools; and wherein an operation timing is set so that the PTO clutch is disengaged after traveling is detected to have stopped when the braking operation tools are operated in the pressing direction, and that the PTO clutch is engaged before traveling is started when the braking operation tools are operated in the press-releasing direction.

With the transmission device for a work vehicle of the present invention, the operation timing of the stop operation mechanism and the PTO clutch is set so that when the braking operation tools are operated in the pressing direction, the PTO clutch is disengaged after traveling is detected to have stopped, and when the braking operation tools are operated in the press-releasing direction, traveling is detected as not having begun and the PTO clutch is engaged.

Therefore, there is the advantage of always being able to set the operative relationship between vehicle body travel and the PTO clutch to the appropriate timing, because the PTO clutch is disengaged in a state of traveling detected as having stopped when the braking operation tools are operated in the pressing direction, and the PTO clutch is engaged in a state of traveling detected as having stopped when the braking operation tools are operated in the press-releasing direction. There is also the advantage of being able to maintain the appropriate timing even when the braking operation tools are suddenly pressed or released from being pressed all at once.

Advantages are thereby achieved wherein, e.g., it is possible to perform work resulting in little tillage residue if the implement driven by the external power take-off shaft is a rotary tiller, and to perform work in which there is little danger of torn up grass or uncut clusters if the implement is a mower.

In the configuration described above, it is preferable that a changeover switch capable of interrupting the link between the braking operation tools and the PTO clutch be provided.

Since a changeover switch capable of interrupting the link between the braking operation tools and the PTO clutch is provided, the transmission device can be used in a state in which the PTO clutch is not controlled in cases in which the link is not needed, i.e., cases in which the implement is not linked to the external power take-off shaft, or cases such as when the implement is linked to the external power take-off shaft yet the implement is constantly and continuously driven and there is no need to interrupt driving.

The resulting advantage is the ability to use a drive state suited to the implement linked to the external power take-off shaft. There is also an advantage of being able to avoid loss of work efficiency due to needless control being performed.

In the configuration described above, it is preferable that a PTO shaft sensor for detecting the rotation of the external power take-off shaft be provided, and the operation of the stop operation mechanism and the PTO clutch be linked with the braking operation tools only when the external power take-off shaft is rotating.

Since the action of the stop operation mechanism and the PTO clutch is linked with the braking operation tools upon detecting whether or not the external power take-off shaft is actually rotating, it is possible to perform the linking operation only when the operation of linking the stop operation mechanism and the PTO clutch with the braking operation tools is necessary, and to eliminate needless control operations.

Therefore, there are the advantages of being able to stop the driving of the external power take-off shaft and simultaneously switch to an unlinked state when there is no need to use the implement even while the implement remains linked to the external power take-off shaft, and to avoid loss of work efficiency due to needless control being performed.

In the configuration described above, it is preferable that a PTO clutch sensor for detecting the connected state of the PTO clutch be provided, and the operation of the stop operation mechanism and the PTO clutch be linked with the braking operation tools only when the PTO clutch is in the engaged state.

Since a detection is made as to whether or not the PTO clutch is in the engaged state and the operation of the stop operation mechanism and the PTO clutch is linked with the braking operation tools, it is possible to perform the linking operation only when the operation of linking the stop operation mechanism and the PTO clutch with the braking operation tools is necessary, and to eliminate needless control operations.

Therefore, there are the advantages of being able to disengage the PTO clutch and stop the driving of the implement when there is no need to use the implement even while the implement remains linked to the external power take-off shaft, thereby simultaneously switching to a state in which the linking operation is not performed, and to avoid loss of work efficiency due to needless control being performed.

In the configuration described above, it is preferable that a forward travel detection sensor for detecting a forward traveling state be provided, and the operation of the stop operation mechanism and the PTO clutch be linked with the braking operation tools only during a forward traveling state.

Since a detection is made as to whether or not the work vehicle is in a forward traveling state and the operation of the stop operation mechanism and the PTO clutch is linked with the braking operation tools, it is possible to perform the linking operation only when the operation of linking the stop operation mechanism and the PTO clutch with the braking operation tools is necessary, and to eliminate needless control operations.

Therefore, in cases of using a work mode in which work is performed while the work vehicle repeatedly travels forward and backward, there is the advantage of being able to perform the operation of linking the stop operation mechanism and the PTO clutch with the braking operation tools only during forward travel in which work is actually being performed, to discontinue the linking operation during reverse travel in which work is not being performed, and to avoid loss of work efficiency due to needless control being performed.

A transmission device for a work vehicle of the present invention comprises a travel drive system for transmitting engine power to a travel device; an implement drive system for transmitting engine power to an external power take-off shaft; braking operation tools for a braking operation; a stop operation mechanism provided to the travel drive system and capable of interrupting the transmission of power to the travel device; and a hydraulically operated PTO clutch for interrupting the transmission of power to the external power take-off shaft, the PTO shaft being provided to the implement drive system;

wherein the stop operation mechanism and the PTO clutch are linked with the braking operation tools so that the stop operation mechanism is operated to a power transmission stopping position and the PTO clutch is disengaged along with a pressing operation of the braking operation tools, and the PTO clutch is engaged along with a press-releasing operation of the braking operation tools; and wherein an operation timing is set so that the PTO clutch is disengaged after the stop operation mechanism has been operated to the power transmission stopping position and a predetermined time period has elapsed when the braking operation tools are operated in the pressing direction, and that the state in which power transmission is stopped by the stop operation mechanism is released after engaging of the PTO clutch is started and a predetermined time period has elapsed when the braking operation tools are operated in the press-releasing direction.

With the transmission device for a work vehicle of the present invention, the operation timing of the stop operation mechanism and the PTO clutch is set so that when the braking operation tools are operated in the pressing direction, the PTO clutch is disengaged after the stop operation mechanism has been operated to the power transmission stopping position and a predetermined time period has elapsed when the braking operation tools are operated in the pressing direction, and the state in which power transmission is stopped by the stop operation mechanism is released after engaging of the PTO clutch is started and a predetermined time period has elapsed when the braking operation tools are operated in the press-releasing direction.

Therefore, there is the advantage of always being able to set the operative relationship between vehicle body travel and the PTO clutch to the appropriate timing, because when the braking operation tools are operated in the pressing direction, the PTO clutch is disengaged in a state in which a predetermined time period has elapsed since the operation of the stop operation mechanism to the power transmission stopping position and there is a sufficiently high possibility of traveling having stopped; and when the braking operation tools are operated in the press-releasing direction, the state of stopped power transmission by the stop operation mechanism is released after a predetermined time period has elapsed since the operation of engaging the PTO clutch was begun. There is also the advantage of being able to maintain the appropriate timing even when the braking operation tools are suddenly pressed or released from being pressed all at once.

Advantages are thereby achieved wherein, e.g., it is possible to perform work resulting in little tillage residue if the implement driven by the external power take-off shaft is a rotary tiller, and to perform work in which there is little danger of torn up grass or uncut clusters if the implement is a mower.

A transmission device for a work vehicle of the present invention comprises a travel drive system for transmitting engine power to a travel device; an implement drive system for transmitting engine power to an external power take-off shaft; braking operation tools for applying braking action to the traveling of a vehicle body; and a hydraulically operated PTO clutch for interrupting the transmission of power to the external power take-off shaft, the PTO shaft being provided to the implement drive system;

wherein the PTO clutch and the braking operation tools are linked so that the clutch pressure of the PTO clutch is changed and the clutch is disengaged along with an increase in the amount by which the braking operation tools are operated in the travel-stopping direction, and the clutch pressure is changed and the clutch is engaged along with a decrease in the amount operated in the travel-stopping direction; an operation timing is set between the braking operation tools and the PTO clutch so that the PTO clutch is disengaged after the braking operation of the braking operation tools has been started by operating the braking operation tools in the travel-stopping direction, and the PTO clutch starts to be engaged before the braking operation of the braking operation tools is released by operating the braking operation tools in the travel stop releasing direction; and wherein controller is also provided for performing control so that the change in the clutch pressure of the PTO clutch relative to the operated amount of the braking operation tools is less at the clutch engagement side than at the clutch disengagement side.

With the transmission device for a work vehicle of the present invention, it is possible to perform tilling work with good operability and with little tillage residue, because the PTO clutch and the braking operation tools are linked, the PTO clutch is automatically engaged and disengaged merely by the operation of the braking operation tools, and an operation timing is set so that the PTO clutch is disengaged after traveling of the vehicle body is stopped and so that engaging of the PTO clutch is begun before the stopping operation by the braking operation tools is released.

In cases in which good operability and reduced tillage residue are an object, there is a possibility that a new problem will be encountered in that the degree of wear is greater in a PTO clutch operated to start and stop via a semi-clutch state. This problem is resolved in the present invention by adopting an approach in which the rate of change in the clutch pressure of the PTO clutch, which is engaged and disengaged by changes in clutch pressure, differs in conjunction with the operated direction of the braking operation tools.

In other words, the change in the clutch pressure of the PTO clutch relative to the operated amount of the braking operation tools is controlled so that changes occurring when the braking operation tools are operated in the stop-releasing direction and the PTO clutch is engaged are smaller than changes occurring when the braking operation tools are operated in the travel-stopping direction and the PTO clutch is disengaged, the PTO clutch is quickly disengaged when travel is stopped, and the PTO clutch is slowly engaged via a semi-clutch state when the stop is released.

Therefore, there are advantages in that merely by operating the braking operation tools, the PTO clutch can be automatically engaged or disengaged and travel stopping can be released after clutch engagement, the effects of good operability and reduced tillage residue are achieved, wear in the clutch plate due to a semi-clutch operation when travel is stopped is reduced, and the durability of the PTO clutch can be improved.

In the configuration described above, it is preferable that the end position of the engaging operation of the PTO clutch, which accompanies the operation of the braking operation tools toward a travel stop release, be set toward the start of the travel stop releasing operation and away from the end position of the operation to release the travel stop of the braking operation tools in the operation stroke of the braking operation tools.

Since the end position of the engaging operation of the PTO clutch, which accompanies the operation of the braking operation tools toward a travel stop release, is set toward the start of the travel stop releasing operation and away from the end position of the operation to release the travel stop of the braking operation tools, there is an area, disposed between the end position of the engaging operation of the PTO clutch and the end position of the operation to release the travel stop, in which the clutch pressure of the PTO clutch does not change during the operation stroke of the braking operation tools, even if the braking operation tools are operated in any amount in the travel-stopping direction.

Therefore, during the travel stop releasing operation of the braking operation tools, for example, even if the operator uses the braking operation tools to lightly rest his feet instead of using the footrest before the travel stop releasing operation has ended, there is an area in which the clutch pressure does not change, whereby unintended occurrences of the semi-clutch state are avoided. Thus, instances in which the operator unintentionally operates the PTO clutch to the semi-clutch state are avoided by providing the operation stroke of the braking operation tools with an area in which the PTO clutch does not operate. It is thereby easy to avoid situations in which the PTO clutch is continually operated in the semi-clutch state for a long period of time without being noticed, and seizing occurs.

In the configuration described above, it is preferable that the position where the PTO clutch starts to disengage in accompaniment with the operation of the braking operation tools in the travel-stopping direction be set toward the end of the travel-stopping operation of the braking operation tools and away from the position in the operation stroke of the braking operation tools where the PTO clutch starts to engage in accompaniment with the operation of the braking operation tools in the travel stop releasing direction.

The resulting advantage is that when the braking operation tools are operated in the travel-stopping direction, the PTO clutch can be disengaged in a short amount of time without performing any operations in which the PTO clutch is abraded in a semi-clutch state over a long period of time, and clutch plate wear can be reduced.

In the configuration described above, it is preferable that display means be provided for displaying the change in PTO clutch pressure accompanying the operation of the braking operation tools in the stop-releasing direction.

Since display means is provided for displaying the change in PTO clutch pressure accompanying the operation of the braking operation tools in the stop-releasing direction, operations can be performed smoothly while monitoring the conditions displayed by the display means and confirming the rate of PTO clutch engagement and disengagement, which is a parameter that cannot be confirmed based on an operating feel.

In the configuration described above, it is preferable that a changeover switch capable of interrupting the link between the braking operation tools and the PTO clutch be provided.

Since a changeover switch capable of interrupting the link between the braking operation tools and the PTO clutch is provided, the transmission device can be used in a state in which the PTO clutch is not controlled in cases in which the link is not necessary, i.e., in cases in which the implement is not linked to the PTO shaft or cases in which the implement is constantly and continuously driven and there is no need to interrupt driving even if the implement is linked to the PTO shaft.

The resulting advantage is the ability to selectively use a drive state suited to the implement linked to the PTO shaft.

DESCRIPTION OF THE PREFERRED EMBODIMENTS

First Embodiment

Overall Configuration of Work Vehicle

Figure 1:
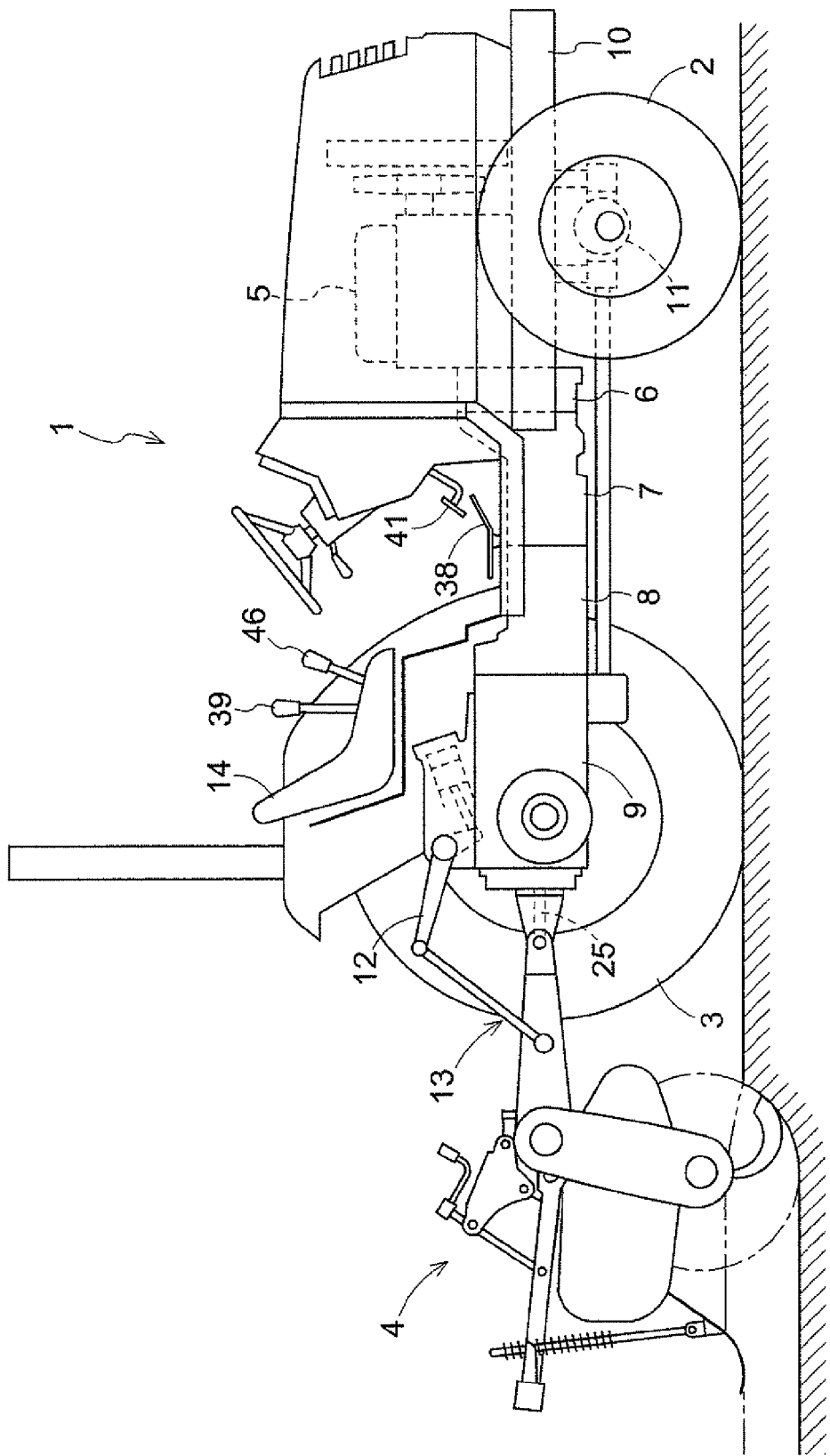
FIG. 1 is an overall side view showing a tractor configured with a tiller design.

FIG. 1 shows a tractor configured with a rotary tiller design, which is an example of a work vehicle comprising the transmission device of the present invention.

This tractor is configured with a rotary tiller 4 raisably and lowerably linked to the rear part of a four-wheel drive tractor frame 1 comprising front wheels 2 and rear wheels 3. The vehicle body of the tractor frame 1 is configured with a mono body design, wherein an engine 5, a primary clutch housing 6, a primary speed change case 7, a mid case 8, and a transmission case 9 are directly coupled in series. A front wheel axle case 11 is rollably supported on a front frame 10 linked to the engine 5, the front wheels 2 are supported to be capable of operating in the steered direction on the left and right of the front wheel axle case 11, and the rear wheels 3 are axially supported on the left and right of the transmission case 9. A link mechanism 13 driven up and down by lift arms 12 is mounted to the rear part of the transmission case 9, and the rotary tiller 4 is linked to the link mechanism 13.

[Configuration of Transmission System]

Figure 2:
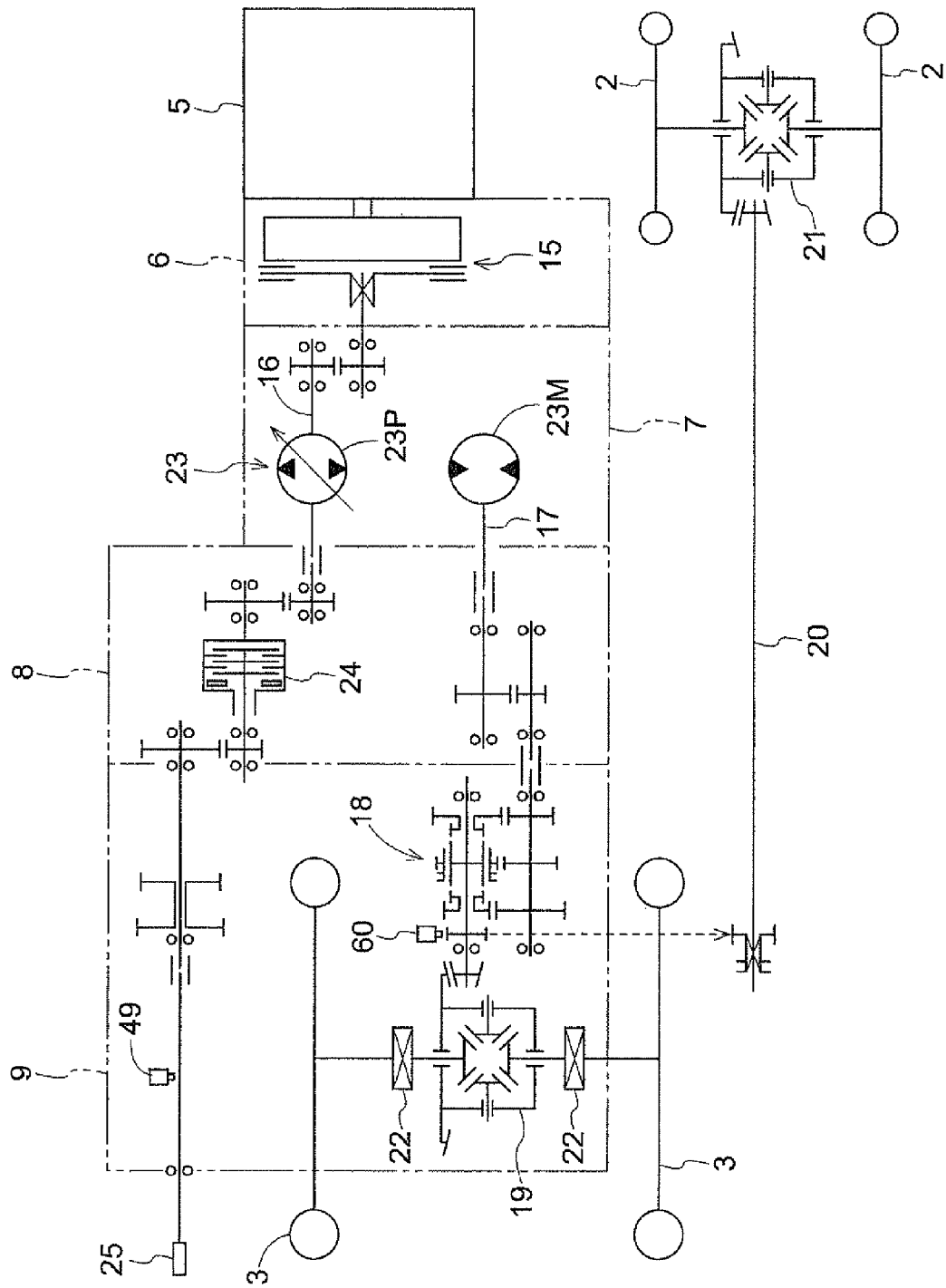
FIG. 2 is a line diagram showing the transmission system.

FIG. 2 shows the transmission system in the tractor frame 1. The output of the engine 5 is transmitted to an input shaft 16 provided to the primary speed change case 7 via a primary clutch 15, and the speed-change power taken off from an output shaft 17 provided to the primary speed change case 7 is transmitted to the left and right rear wheels 3 via a rear differential device 19 and side brakes 22 after being shifted between three speeds by a gear-based secondary speed change device 18. Some of the travel-related power changed in speed by the secondary speed change device 18 is taken off from the bottom of the transmission case 9, transmitted to the front wheel axle case 11 via a transmission shaft 20, and transmitted to left and right front wheels 2 via the a front differential gear device 21.

A vehicle speed sensor 60 for detecting the speed of the transmission shaft of the travel system whose speed is changed by the secondary speed change device 18 is provided near the branching locations of the rear differential device 19 and the transmission shaft 20 for transmitting power to the front wheels 2.

A hydro static transmission (HST) 23 is housed within the primary speed change case 7. The continuously variable transmission 23 is composed of a variable capacity hydraulic pump 232 and hydraulic motor 23M configured with an axial plunger design, and is configured so that the swash plate angle of the hydraulic pump 23P rotatably driven at a constant speed by the input shaft 16 is varied, and the discharge direction and discharged amount of discharged pressure oil is varied as well, whereby the output shaft 17 of the hydraulic motor 23M receiving the pressure oil is rotatably operated in a stepless manner in forward or in reverse.

The input shaft 16 extends out rearward through the hydraulic pump 232, some of the constant-speed rotational power transmitted to the input shaft 16 is transmitted farther rearward via the a PTO clutch 24 housed within the mid case 8 and taken off from a PTO shaft 25 (external power take-off shaft) protruding on the rear part of the transmission case 9, and the rotary tiller 4 is driven by the PTO power irrespective of the traveling speed change. A PTO shaft sensor 49 for detecting whether or not the PTO shaft 25 is rotating is also housed within the transmission case 9.

Figure 3:
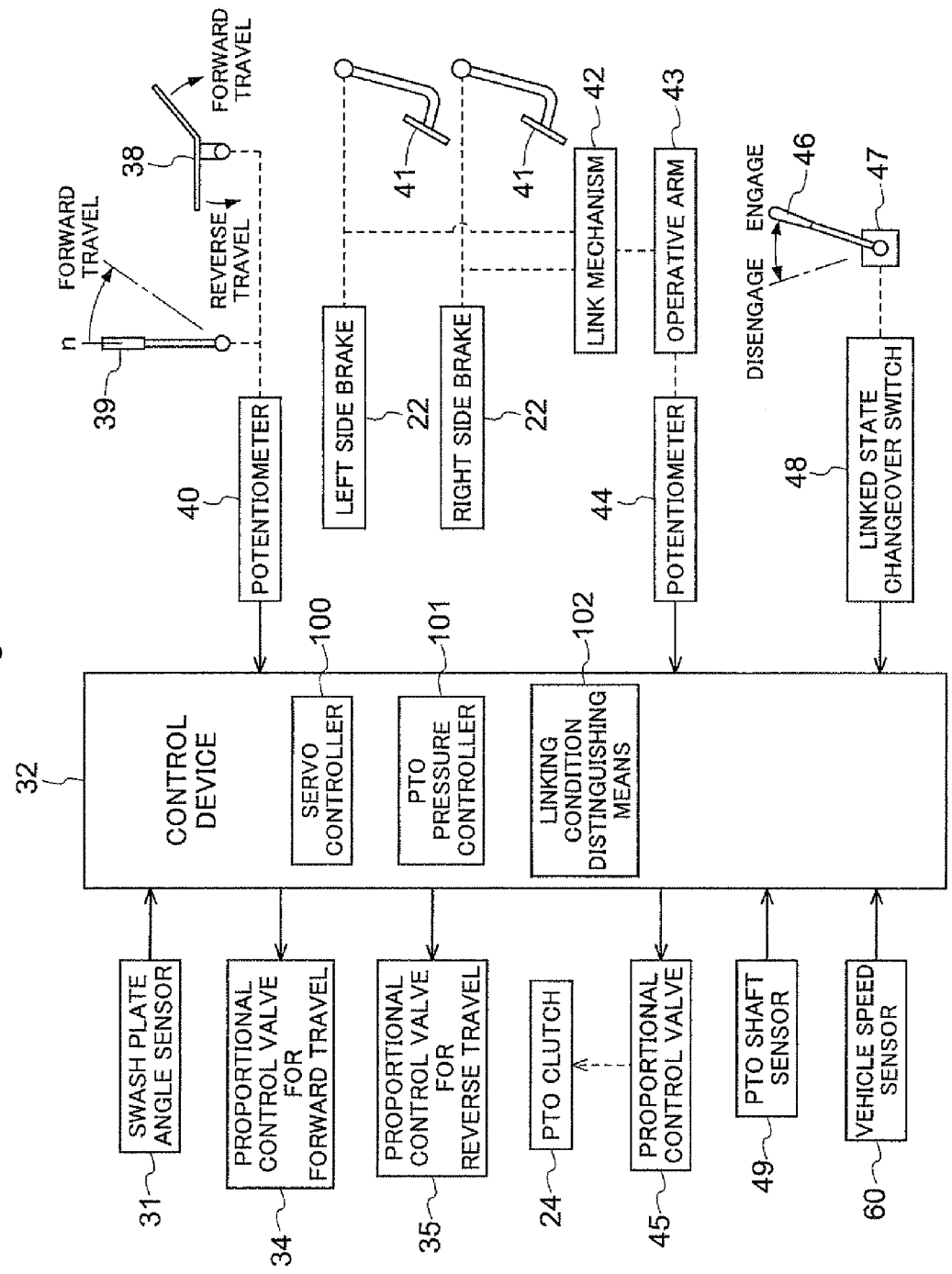
FIG. 3 is a block diagram showing the control system.
Figure 7:
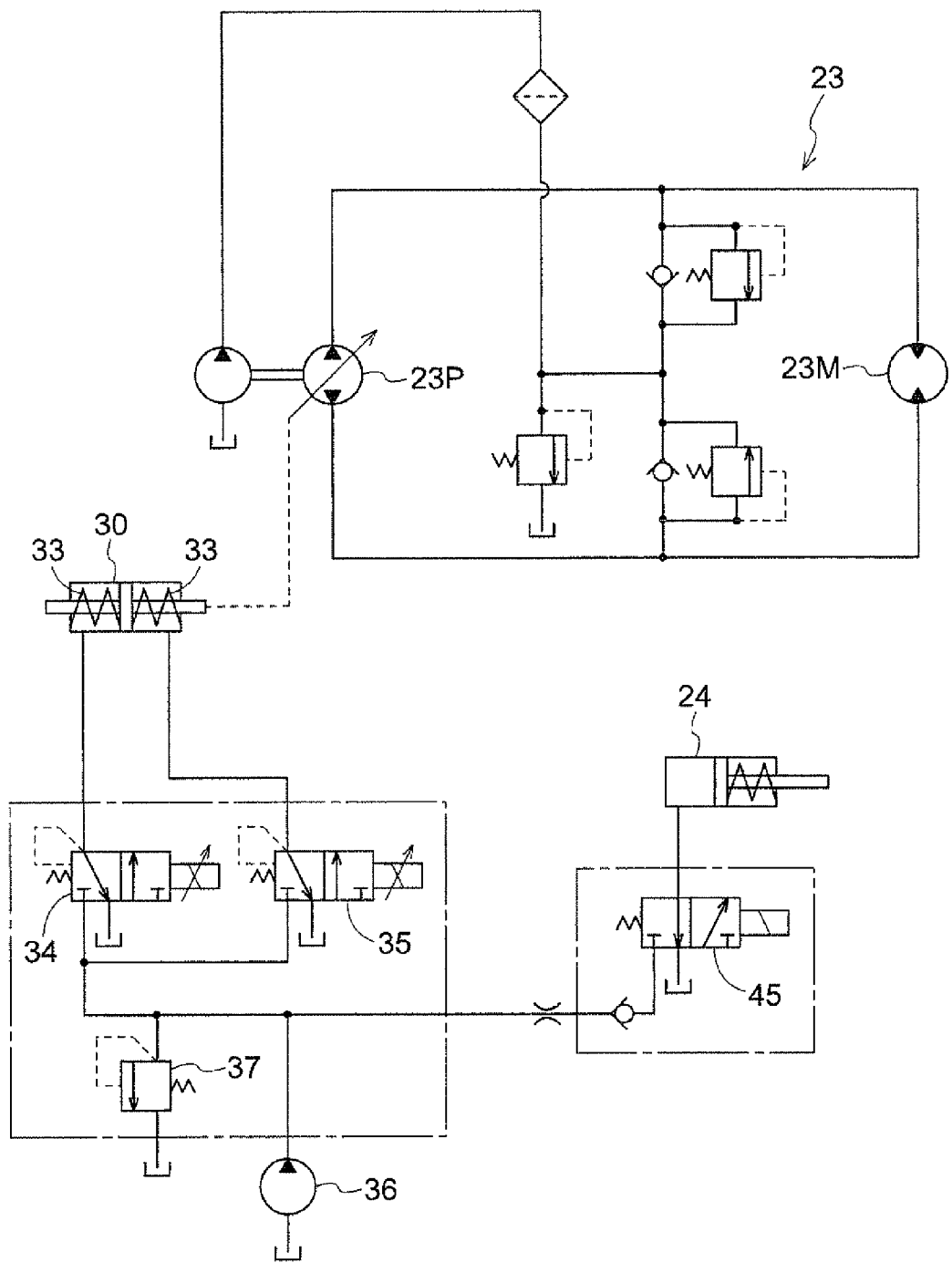
FIG. 7 is a hydraulic circuit diagram of the hydro static transmission.

The speed changing of the continuously variable transmission 23 (HST) is controlled by hydraulic servo means, and the configuration thereof is shown in FIGS. 3 and 7.

The swash plate angle of the hydraulic pump 23P in the continuously variable transmission 23 is configured to be capable of being varied in forward and reverse by a reciprocating servo cylinder 30, and the swash plate angle is detected by a swash plate angle sensor 31 using a potentiometer and is inputted to a control device 32. The servo cylinder 30 is urged to return by a pair of return springs 33 to a neutral position where the swash plate angle is zero, and the servo cylinder 30 is reciprocated by hydraulic control via a proportional control valve 34 for forward travel and a proportional control valve 35 for reverse travel connected to the control device 32.

The proportional control valves 34, 35 are urged to a return position in which the servo cylinder 30 is communicated with a tank in a state in which no energizing control is performed, and when both of the proportional control valves 34, 35 are in the return position, the servo cylinder 30 is brought into a free state, and the continuously variable transmission 23 returns to neutral. A relief valve 37 is provided to the pressure oil supply passages leading from a pump 36 to the proportional control valves 34, 35, and the maximum of the system pressure in the hydraulic servo means is limited.

[Configuration of Speed Change Operation System]

A speed change pedal 38 and a speed change lever 39 are mounted as speed change operation tools on the tractor frame 1. The speed change pedal 38 is disposed in the right foot area of the driver seat 14, and the speed change lever 39 is disposed to the lateral left of the driver seat 14.

The speed change pedal 38 is configured to be capable of being pressed forward and backward, and is mechanically urged to return to the neutral position by a cam mechanism (not shown).

The pressed position of the speed change pedal 38 is detected by a potentiometer 40 and inputted to the control device 32, and the action of the proportional control valves 34, 35 is controlled by servo controller 100 provided to the control device 32. The valves are controlled on the basis of the pressed position information of the speed change pedal 38 detected by the potentiometer 40, feedback information from the swash plate angle sensor 31, and detected information of a stopped state detection switch 61 for detecting the action of a stop operation pedal 60, described hereinafter.

In other words, the servo controller 100 controls the action of the proportional control valves 34, 35 so as to reciprocate the servo cylinder 30 in accordance with the pressed direction and pressed amount of the speed change pedal 38 detected by the potentiometer 40, and implements a swash plate angle corresponding to the pressing of the speed change pedal 38, whereby the speed is changed steplessly during forward and reverse travel.

When the potentiometer 40 detects that the speed change pedal 38 is not pressed any longer, the proportional control valves 34, 35 acts in a controlled manner, the speed change pedal 38 is automatically returned to the neutral position, the output of travel propulsion force is cut off, and control is performed so that travel stops.

The speed change lever 39 is mechanically linked in a manner capable of operating the speed change pedal 38 one way in the forward travel speed change direction only, and is supported in a manner capable of maintaining an arbitrary operating position by friction. The operating position of the speed change lever 39 is detected by the potentiometer 40 for detecting the operating position of the speed change pedal 38. With the speed change lever 39 held in a link-releasing position n, the link between the speed change lever 39 and the speed change pedal 38 is released, and the speed change pedal 38 can be pressed throughout the entire range from the forward travel range to the reverse travel range.

As the speed change lever 39 is operated forward from the link-releasing position n shown in FIG. 3, the speed change pedal 38 is operated by contact in the forward-pressed direction (forward speed-increasing direction), and the speed change lever 39 is held by friction in an arbitrary operating position in the speed change range of forward travel, whereby the speed change pedal 38 is prevented from returning to neutral and is held in the arbitrary speed change range of forward travel, and the vehicle travels forward at an arbitrary constant speed corresponding to the operating position of the speed change lever 39. With the speed change pedal 38 held in the neutral position in the speed change range of forward travel by the speed change lever 39, the speed change pedal 38 is allowed to be pressed further in the forward travel speed-increasing direction, and is designed to return to the speed set by the speed change lever 39 when released from being pressed.

[Linked Configuration of Travel Braking and PTO Clutch]

Figure 6:
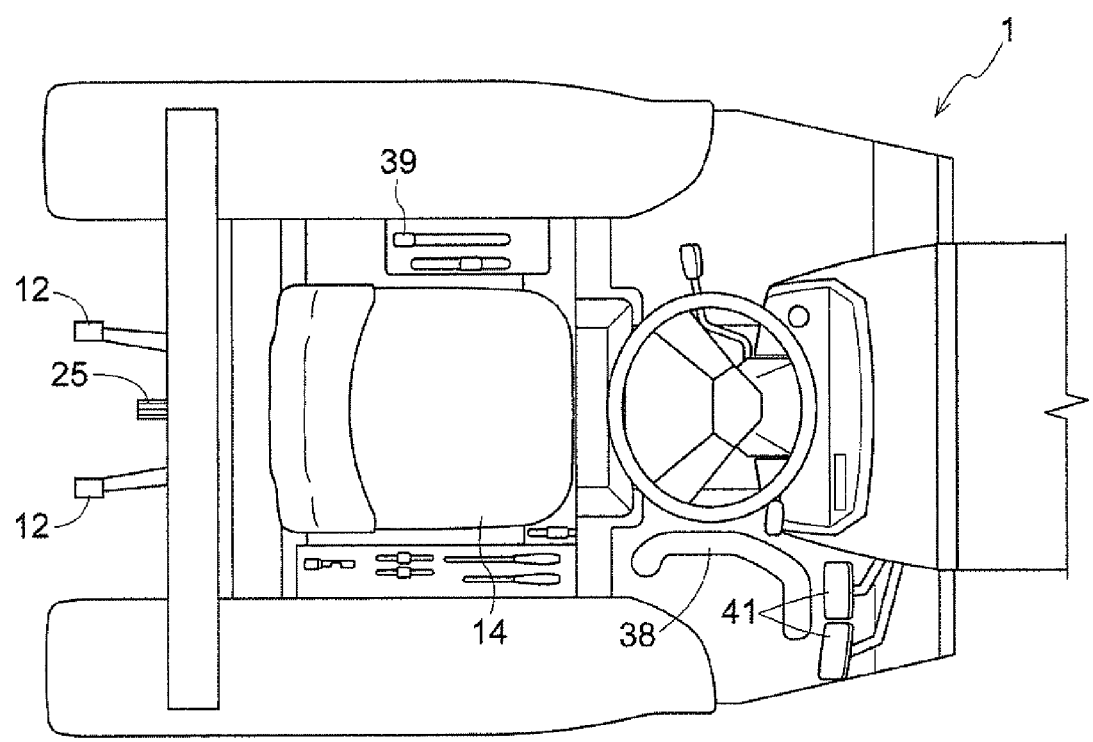
FIG. 6 is a plan view showing the arrangement of the side brake pedals.

As a pair of braking operation tools linkably engaged separately to the left and right side brakes 22, brake pedals 41 are disposed in parallel on the left and right in proximity to the speed change pedal 38 as shown in FIG. 6, and the left and right brake pedals 41 are engageably coupled to an operative arm 43 via a link mechanism 42.

This link mechanism 42 is configured so that the operative arm 43 is not turned by operating only one brake pedal 41 in the pressed direction, which is the travel-stopping direction, and the operative arm 43 is turned at an angle corresponding to the pressed amount only when both of the brake pedals 41 are pressed simultaneously. The turning angle of the operative arm 43 is detected by a potentiometer 44 and is inputted to the control device 32.

The PTO clutch 24 is configured as a multiple plate friction clutch which engages when oil pressure is applied and disengages under spring urging force when the oil pressure is no longer applied, wherein the applied oil pressure is controlled via an electromagnetic proportional control valve 45 connected to the control device 32.

A PTO clutch lever 46 is disposed to the lateral right of the driver seat 14, the operating position of the PTO clutch lever 46 is detected by a PTO engage/disengage switch 47, and the detected information is inputted to the control device 32. Also connected to the control device 32 is a linked state changeover switch 48 for changing between a state in which the PTO clutch 24 and the left and right side brakes 22 operate while linked, and a state in which the linked operation is ended and the PTO clutch 24 and the left and right side brakes 22 operate independently.

The control device 32 is provided with PTO pressure controller 101 for outputting a control signal to the electromagnetic proportional control valve 45 on the basis of the detected information of the linked state changeover switch 48, the PTO engage/disengage switch 47, and the potentiometer 44 for detecting the turning angle of the operative arm 43.

Therefore, when the PTO clutch lever 46 is operated to the "disengage" position, the proportional control valve 45 is controlled so that the application of oil pressure is ended, and the PTO clutch 24 becomes disengaged. When the PTO clutch lever 46 is operated to the "engage" position, a control signal is outputted from the control device 32 to the proportional control valve 45 so that a predetermined high oil pressure is applied, and the PTO clutch 24 becomes engaged.

When the linked state changeover switch 48 is in the "disengage" state, the control device 32 maintains the PTO clutch 24 in the "disengage" state or the "engage" state in accordance with the operating position of the PTO clutch lever 46 irrespective of the operation of the left and right brake pedals 41.

The PTO clutch 24 is controlled in the following manner in conjunction with the operation of the left and right brake pedals 41 as long as the PTO engage/disengage switch 47 detects that the linked state changeover switch 48 has been operated to "engage" and the operating position of the PTO clutch lever 46 is in "engage."

In cases in which the brake pedals 41 are simultaneously operated in a pressed state, the braking force of the side brakes 22 increases as the pressed amount of the brake pedals 41 increases, and the clutch pressure of the PTO clutch 24 is controlled in association with the braking state by the operated direction and operated amount of the brake pedals 41.

Figure 4:
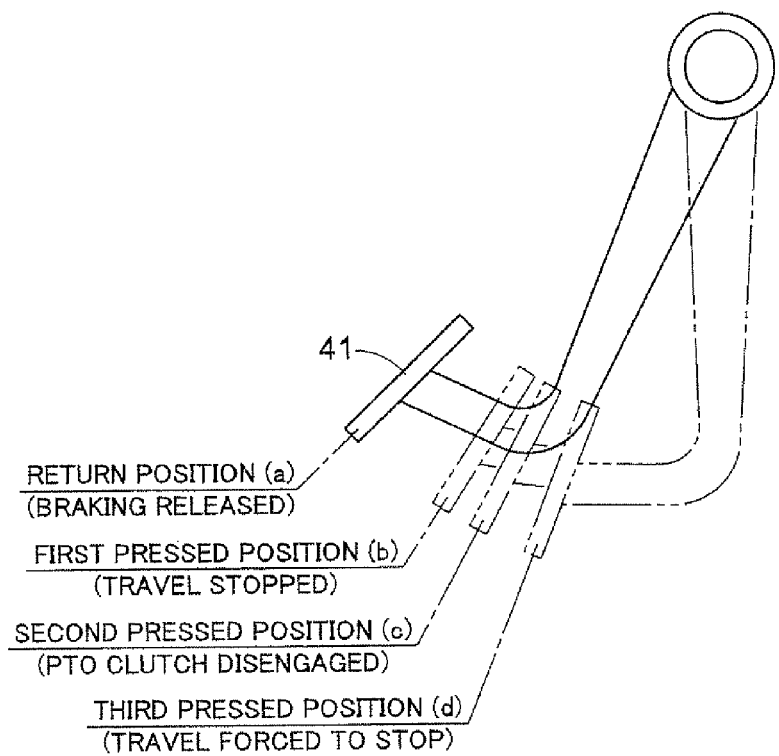
FIG. 4 is a drawing describing the action of the side brake pedals.
Figure 5:
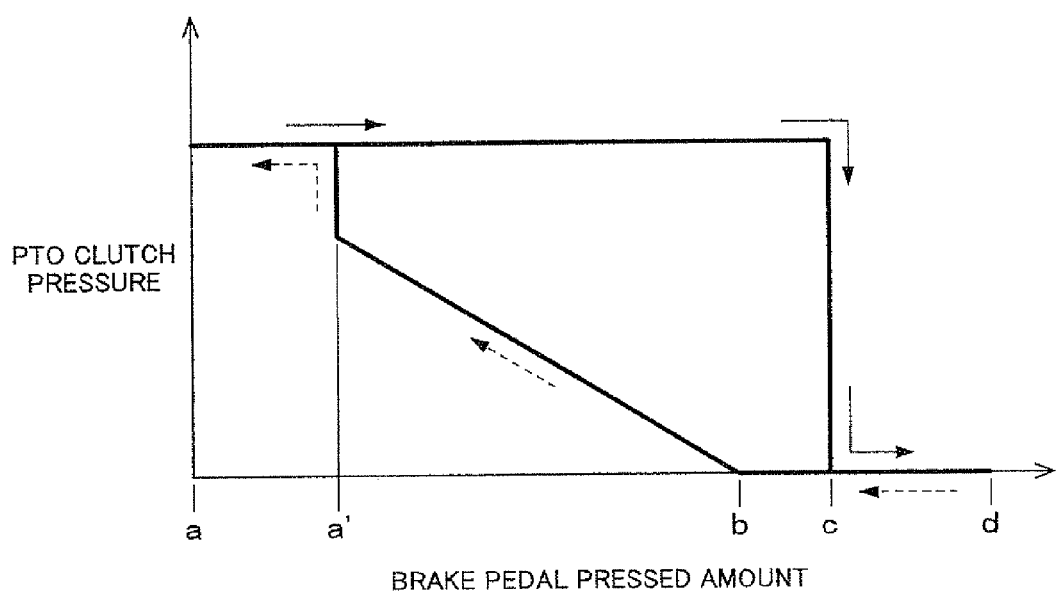
FIG. 5 is a chart showing the relationship between the extent to which the side brake is operated and PTO pressure.

First is a description of the operating positions in the pressed direction, which is the travel-stopping direction of the brake pedals 41, shown in FIGS. 4 and 5.

In a state in which the speed change lever 39 is held in an arbitrary forward travel position to set the forward travel speed, and in which the PTO clutch lever 46 is operated to the "engage" position, the left and right brake pedals 41 are released from being pressed and returned to the return position (a), as shown by the solid lines in FIG. 4, whereupon the side brakes 22 is brought into a brake-released state, the electric current through the proportional control valve 34 for forward travel is controlled, the servo cylinder 30 is operated to a predetermined position, and the continuously variable transmission 23 is held in a forward travel speed change state corresponding to the operating position of the speed change lever 39. The PTO clutch 24 is controlled so that the PTO pressure controller 101 outputs a control signal to the proportional control valve 45, and high oil pressure is supplied to the PTO clutch 24, bringing the PTO clutch 24 into the clutch-engaged state.

When the brake pedals 41 are simultaneously pressed from this state, the left and right side brakes 22 exhibit braking action as the pressed amount increases, the servo cylinder 30 is operatively controlled in the decelerating direction on the basis of the turning angle of the operative arm 43, and the travel speed gradually decreases from the forward travel speed set by the speed change lever 39.

When the brake pedals 41 are simultaneously pressed to the preset first pressed position (b), a state arises in which the electric current to the proportional control valves 34, 35 is blocked by the servo controller 100 irrespective of the speed change lever 39 being held in the speed change range of forward travel, the servo cylinder 30 is returned to the neutral position, the continuously variable transmission 23 is brought into the neutral state, and travel is stopped. At this time, the PTO clutch 24 does not substantially change from the state in which the clutch pressure is at the return position (a) as shown in FIG. 5, and the PTO clutch 24 is in the clutch-engaged state in which a constant high pressure maintained.

As the brake pedals 41 are pressed further past the first pressed position (b), the pressed amount of the brake pedals 41 increases and the braking force also gradually increases, but the clutch pressure of the PTO clutch 24 is kept at a constant pressure and maintained in the engaged state while not substantially changing from being positioned at the return position (a), as shown in FIG. 5. However, when the brake pedals 41 are pressed to a preset second pressed position (c), which is an operating position at which the maximum braking force of the side brakes 22 is obtained, and this situation is detected along with a detection signal from the potentiometer 44, the PTO pressure controller 101 outputs a control signal so as to operate the proportional control valve 45 to open the oil passage after the vehicle body is detected to have stopped traveling by the vehicle speed sensor 60, and the clutch pressure of the PTO clutch 24 is rapidly reduced. The PTO clutch 24 thereby loses all friction force and is brought completely into the clutch-disengaged state.

In other words, when the brake pedals 41 are operated in the pressed direction, the braking force of the side brakes 22 increases according to the operated amount of the brake pedals 41, but the clutch pressure of the PTO clutch 24 does not substantially change up until immediately before the second pressed position (c), and the clutch-engaged state is maintained without being accompanied by a semi-clutch state. When the brake pedals are then pressed past the first pressed position (b), at which traveling stops, to the second pressed position (c), and the vehicle speed sensor 60 detects that traveling has stopped, the clutch pressure of the PTO clutch 24 rapidly decreases, and a clutch-disengaged state is achieved.

When the brake pedal 41 that is on the inside of a turn while operating the front wheels 2 is pressed to make a small turn, the operative arm 43 does not turn, and the above-described deceleration control and PTO clutch 24 disengaging control are therefore not performed.

When the brake pedals 41 are pressed to a third pressed position (d), which is a pressing limit position disposed past the second pressed position (c), the relief valve 37 of the hydraulic servo means is mechanically forced open based on the turning of the operative arm 43, the system pressure of the hydraulic servo means is reduced to zero, the supply of pressure oil to the servo cylinder 30 is ended irrespective of the controlled operating state of the proportional control valves 34, 35 for changing the travel speed, and the continuously variable transmission 23 is returned to neutral.

Thus, when the brake pedals 41 are pressed by a large amount to the third pressed position (d), the supply of pressure oil to the servo cylinder 30 is forcefully cut off, returning the continuously variable transmission 23 to neutral. Therefore, even when an electrical malfunction during traveling causes a situation in which the proportional control valves 34, 35 does not return to the return position, the continuously variable transmission 23 can be returned to neutral and traveling can be stopped if the brake pedals 41 are pressed to the pressing limit.

Next is a description of the operating positions of the brake pedals 41 shown in FIGS. 4 and 5 in the press-releasing direction, which is the direction in which the travel stop is released.

The clutch pressure of the PTO clutch 24 that accompanies the operation of the brake pedals 41 in the press-releasing direction changes between the return position (a) and the second pressed position (c) so as to differ from the clutch pressure of the PTO clutch 24 that accompanies operation in the pressing direction.

Specifically, while the brake pedals 41 return from the second pressed position (c) to the first pressed position (b) as shown in FIG. 5, the PTO pressure controller 101 of the control device 32 outputs a control signal so that the proportional control valve 45 keeps the oil passage open, and the brake pedals 41 are returned while the PTO clutch 24 remains in the clutch-disengaged state. At this time, the electric currents through the proportional control valves 34, 35 are blocked, the servo cylinder 30 has returned to the neutral position, and traveling has stopped.

Midway through the return of the brake pedals 41 from the first pressed position (b) to a nearly returned position (a') up until immediately before the return position (a) as shown in FIG. 5, the vehicle body is detected by the vehicle speed sensor 60 to have stopped traveling, and the PTO pressure controller 101 of the control device 32 starts to output a control signal, so as to adjust the extent by which the oil passage of the proportional control valve 45 is open, in accompaniment with the detection signal from the potentiometer 44 that has detected the operating positions of the brake pedals 41.

The clutch pressure of the PTO clutch 24 is thereby changed according to the operating position of the brake pedals 41 so that the clutch pressure gradually increases as the brake pedals 41 are operated in the returning direction.

When the brake pedals 41 are detected as having reached the nearly returned position (a'), the PTO pressure controller 101 outputs a control signal so as to close off the oil passage of the proportional control valve 45, and the proportional control valve 45 is operated so that a predetermined high oil pressure is applied to the PTO clutch 24.

In other words, while the brake pedals 41 are being returned from the first pressed position (b) to the nearly returned position (a'), the PTO clutch 24 is changed in a semi-clutch state so that the clutch pressure is gradually increased, and a complete clutch-engaged state is achieved when the brake pedals reach the nearly returned position (a').

In the range in which the brake pedals 41 return from the nearly returned position (a') to the return position (a), the PTO clutch 24 is maintained in an engaged state, the braking force gradually decreases in accompaniment with the returning of the brake pedals 41, and the braking force is completely terminated at the return position (a).

The swash plate operated amount, which is the amount by which the swash plate of the hydraulic pump 23P returned to the neutral position is operated in the forward travel direction in accompaniment with the returning of the brake pedals 41, is set based on a detection signal of the potentiometer 40 for detecting the operating positions of the speed change pedal 38 and the speed change lever 39.

In other words, the servo controller 100 sets the awash plate angle of the hydro static transmission 23, which corresponds to the operating position of the speed change lever 39 detected based on a detected signal of the potentiometer 40, to a awash plate angle corresponding to the target speed of the hydro static transmission 23, and the swash plate angle of the hydraulic pump 23P is varied so that this target speed is achieved. At this time, the speed at which the servo cylinder 30 varies the swash plate angle of the hydraulic pump 239 correlates with the speed at which the brake pedals 41 return.

Thus, the speed change lever 39 functions as target speed setting means for setting the target speed of the hydro static transmission 23; and the servo controller 100, the proportional control valves 34, 35, and the servo cylinder 30 constitute swash plate angle controller.

Control of the proportional control valves 34, 35 by the servo controller 100 for controlling the servo cylinder 30 reverts to controllable after rotation is detected at a predetermined rotational speed or greater of the PTO shaft sensor 49. Therefore, traveling of the vehicle body is initiated after the PTO clutch 24 is engaged and the PTO shaft 25 starts to rotate.

The control device 32 comprising the above-described PTO pressure controller 101 constitutes controller for controlling the change in clutch pressure in the PTO clutch 24 relative to the operated amount of the brake pedals 41 as the braking operation tools, so that the change is less at the clutch engagement side than at the clutch disengagement side.

[Distinguishing the Linking Conditions]

The control device 32 is provided with linking condition distinguishing means 102 for determining whether or not the operation of linking the brake pedals 41 with the hydro static transmission 23 and the PTO clutch 24 will be performed, and for outputting a command signal for issuing a command to the PTO pressure controller 101 so as to end the linking of the brake pedals 41 with the hydro static transmission 23 and the PTO clutch 24 when it is determined that the linking operation should not be performed.

The linking condition distinguishing means 102 is configured so as to determine whether or not to perform the linking operation on the basis of respective detected information from the PTO engage/disengage switch 47 operated by the PTO clutch lever 46, the linked state changeover switch 48 operated manually, the PTO shaft sensor 49 provided to a suitable location in the PTO shaft drive system so as to detect whether or not the PTO shaft 25 is being rotatably driven, and the potentiometer 40 for detecting the operating state of the speed change pedal 38.

In other words, the determination is made as shown in the following items (1) through (4) from the results of detecting the engaged/disengaged state of the PTO engage/disengage switch 47 and the engaged/disengaged state of the linked state changeover switch 48, and from the results of detecting whether or not the PTO shaft sensor 49 is being rotatably driven, and whether or not the operation according to the potentiometer 40 is in the forward travel direction.

(1) If the PTO engage/disengage switch 47 has been operated to disengage, it is determined that there is no need to link the brake pedals 41 with the hydro static transmission 23 and the PTO clutch 24, and a command signal is outputted to the PTO pressure controller 101 so as to end the linking of the brake pedals 41 with the hydro static transmission 23 and the PTO clutch 24. If the PTO engage/disengage switch 47 has been operated to engage, a command signal for ending the linking operation is not outputted, so that the linking operation is maintained.

(2) If the linked state changeover switch 48 has been operated to disengage, it is determined that there is no need to link the brake pedals 41 with the hydro static transmission 23 and the PTO clutch 24, and a command signal is outputted to the PTO pressure controller 101 so as to end the linking of the brake pedals 41 with the hydro static transmission 23 and the PTO clutch 24. If the linked state changeover switch 48 has been operated to engage, a command signal for ending the linking operation is not outputted, so that the linking operation is conversely maintained.

(3) When the rotatable driving of the PTO shaft is detected to have stopped by the PTO shaft sensor 49, it is determined that there is no need to link the brake pedals 41 with the hydro static transmission 23 and the PTO clutch 24, and a command signal is outputted to the PTO pressure controller 101 so as to end the linking of the brake pedals 41 with the hydro static transmission 23 and the PTO clutch 24. If the linked state changeover switch 48 has been operated to engage, a command signal for ending the linking operation is not outputted, so that the linking operation is conversely maintained.

(4) When the speed change pedal 38 is detected by the potentiometer 40 to be operated so as to cause the vehicle body to travel forward, or when the vehicle body is detected as traveling forward on the basis of the rotational direction of the vehicle speed sensor 60, it is determined to be necessary to link the brake pedals 41 with the hydro static transmission 23 and the PTO clutch 24, and a command signal for ending the linking operation is not outputted to the PTO pressure controller 101, so that the operation of linking the brake pedals 41 with the hydro static transmission 23 and the PTO clutch 24 is maintained. Conversely, when the speed change pedal 38 is detected by the potentiometer 40 is detected to not be operated so as to cause the vehicle body to travel forward, or when the vehicle body is detected as traveling in reverse on the basis of the rotational direction of the vehicle speed sensor 60, a command signal for ending the linking operation is outputted.

The linking condition distinguishing means 102 is configured so that when it is determined in any one of the above items (1) through (4) that there is no need to link the brake pedals 41 with the hydro static transmission 23 and the PTO clutch 24, a command signal for ending the linking of the brake pedals 41 with the hydro static transmission 23 and the PTO clutch 24 is outputted to the PTO pressure controller 101.

Additional Embodiment 1

Figure 8:
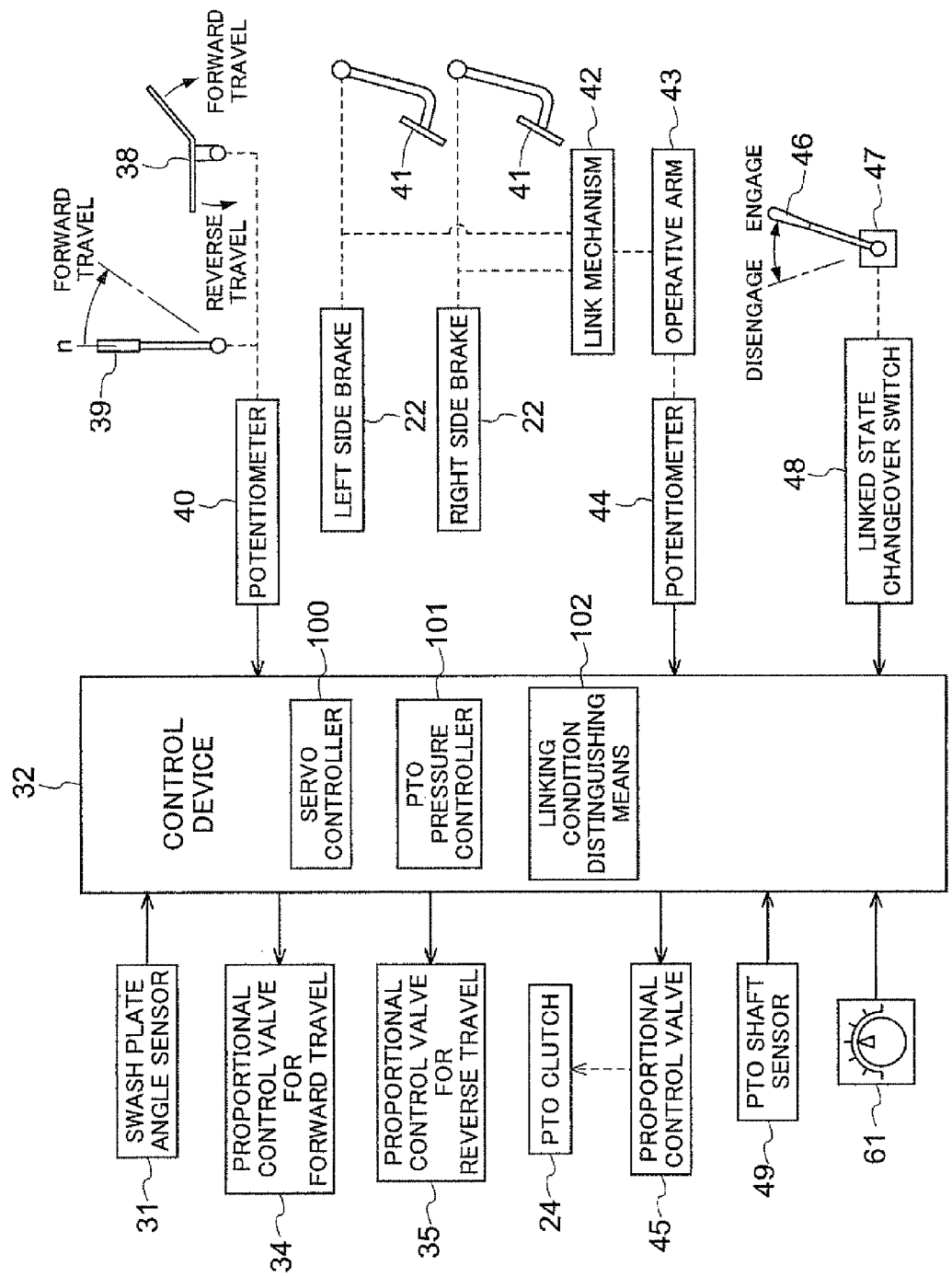
FIG. 8 is a block diagram showing the control system of an additional embodiment.

In the embodiment described above, a vehicle speed sensor 60 is provided, and a signal of detecting a travel stopped state from the vehicle speed sensor 60 is used as an element for setting the timing of controlling the engaging and disengaging of the PTO clutch 24, as shown in FIG. 3. The present invention is not limited to this setup alone, and another possibility is to provide a timer 61 and to adopt an arrangement in which a setting signal from the timer 61 is inputted to the control device 32 as shown in FIG. 8, wherein a setting time set by the timer 61 is used as an element for setting the travel stopped state and the associated timing of controlling the engaging and disengaging of the PTO clutch 24.

In this case, a detection signal of the potentiometer 44 for detecting the pressed direction and pressed amount of the brake pedals 41 is inputted to the PTO pressure controller 101, as is information on the setting time set by the timer 61.

In an operation in which the brake pedals 41 are moved in the pressing direction, after the continuously variable transmission 23 is operated to the neutral position, which is the power transmission cessation position, the PTO pressure controller 101 then operates the proportional control valve 45 toward opening the oil passage after a predetermined time t1 so that the PTO clutch 24 is disengaged after the predetermined time t1 has elapsed, the predetermined time t1 being the time period over which pressing is sustained as set by the timer 61, and the PTO clutch 24 is controlled to the disengaged state.

In an operation in which the brake pedals 41 are moved in toward being released from pressing, after the PTO shaft sensor 49 detects the rotation of the PTO shaft 25 and a predetermined time t2 has elapsed, the time t2 being the time period over which pressing is released as set by the timer 61, the PTO pressure controller 101 then performs control in conjunction with the servo controller 100 so as to enable control of the proportional control valves 34, 35 by the servo controller 100 for controlling the servo cylinder 30.

The predetermined time t1 in the pressing direction as set by the timer 61 is a time estimated as the time needed by a work vehicle traveling at a usual work speed for the vehicle body to actually come to a stop after the continuously variable transmission 23 has been operated to the neutral position in accompaniment with the pressing of the brake pedals 41.

The predetermined time t2 in the press-releasing direction as set by the timer 61 is a time estimated as the time needed for the clutch pressure of the PTO clutch 24 to gradually increase and for the rotational speed of the PTO shaft 25 to reach the predetermined rotational speed after the PTO shaft sensor 49 starts to detect the rotation of the PTO shaft 25.

The predetermined times t1, t2 described above may be configured so that their settings can be varied individually by manual operation.

Additional Embodiment 2

In the above-described embodiments, when the brake pedals 41 as braking operation tools are being operated in the pressing direction as shown in FIG. 5, the clutch pressure of the PTO clutch 24 remains substantially unchanged up until immediately before the second pressed position (c) while the clutch engagement is maintained without a semi-clutch state, and when the brake pedals 41 are pressed past the first pressed position (b), which is a position at which traveling stops, to the second pressed position (c), control is performed so that the clutch pressure of the PTO clutch 24 is rapidly reduced and a clutch-disengaged state is achieved. When the brake pedals 41 are being operated in the press-releasing direction, the PTO clutch 24 is changed so that the clutch pressure gradually increases in a semi-clutch state while the brake pedals 41 are being returned from the first pressed position (b) to the nearly returned position (e).

However, the present invention is not limited to control being performed so that the clutch pressure always changes in this manner. It is possible, for example, to make appropriate modifications and perform control so that the clutch pressure of the PTO clutch 24 is changed gently from slightly before the second pressed position (c), and the clutch is completely disengaged at the point in time when the second pressing position (c) is reached during operation of the brake pedals 41 in the pressing direction.

Thus, there is no hysteresis in the control characteristics between the pressing direction and the press-releasing direction of the brake pedals 41, and the clutch pressure of the PTO clutch 24 may be controlled in conjunction with the operation of pressing the brake pedals 41.

Additional Embodiment 3

The brake pedals 41 are not limited to a pair of left and right side brake pedals 41 used in the operation of turning the vehicle body, and may also be brake pedals designated solely for braking.

Additional Embodiment 4

The stop operation mechanism is not limited to the hydro static transmission 23, and may also be a gear-based speed change device or a travel clutch.

Additional Embodiment 5

The forward/reverse travel detection sensor is not limited to detecting the operating state of the speed change pedal 38, and another possible example includes a work vehicle not having a hydro static transmission 23, or a work vehicle having a hydro static transmission 23 but also having a separate forward/reverse travel speed change device, in which case an arrangement can be adopted in which the operating state of the forward/reverse travel speed change device is detected. It is also possible to adopt an arrangement in which the rotational direction of the vehicle wheel drive axle is detected.

Additional Embodiment 6

The timer 61 for setting the predetermined times t1, t2 is not limited to a timer whose settings can be varied, and may also be configured by a program for counting an internal clock in the control device 32.

Additional Embodiment 7

The condition for determining whether or not the linking of the brake pedals 41 with the hydro static transmission 23 and the PTO clutch 24 will be controlled by the PTO pressure controller 101 may also be set so that the linking operation is performed only when the secondary speed change is set to the work speed.

Additional Embodiment 8

The condition for determining whether or not the linking of the brake pedals 41 with the hydro static transmission 23 and the PTO clutch 24 will be controlled by the PTO pressure controller 101 may also be set as a condition such that the linking operation is performed only when rolling control of the implement, automatic raising/lowering control, or the like is carried out.

Second Embodiment

Figure 9:
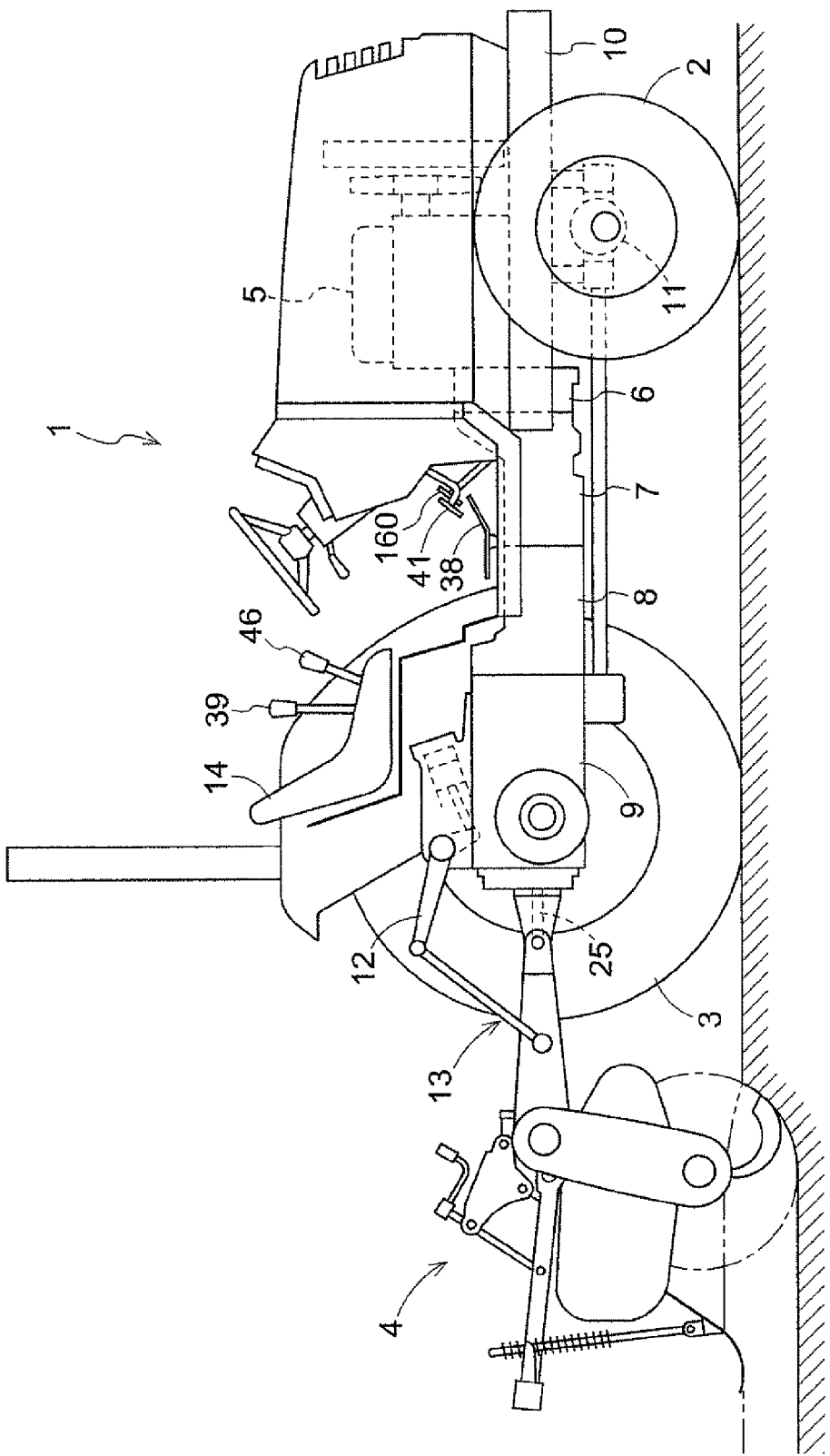
FIG. 9 is an overall side view showing a tractor of the second embodiment.
Figure 10:
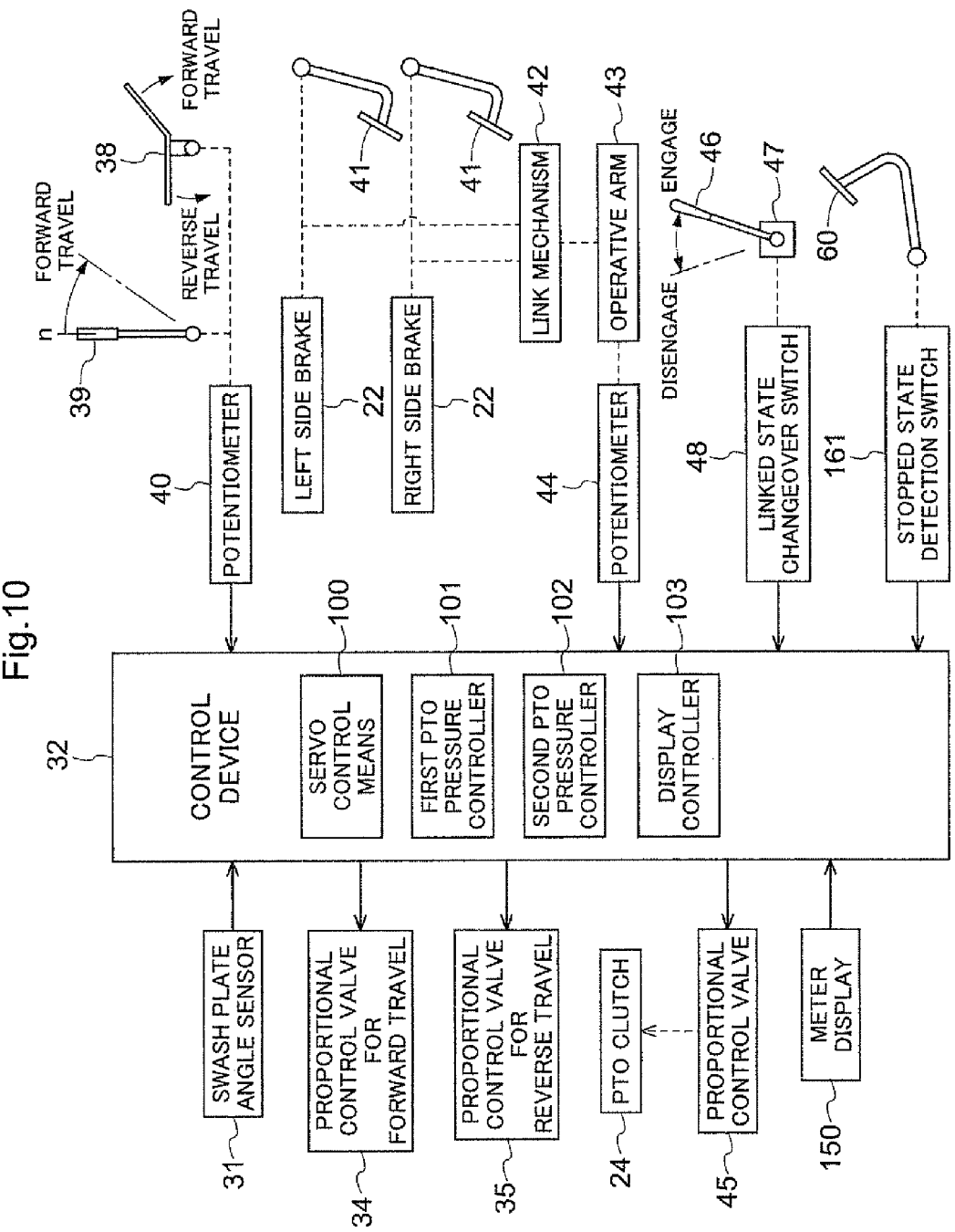
FIG. 10 is a block diagram showing the control system of the second embodiment.
Figure 11:
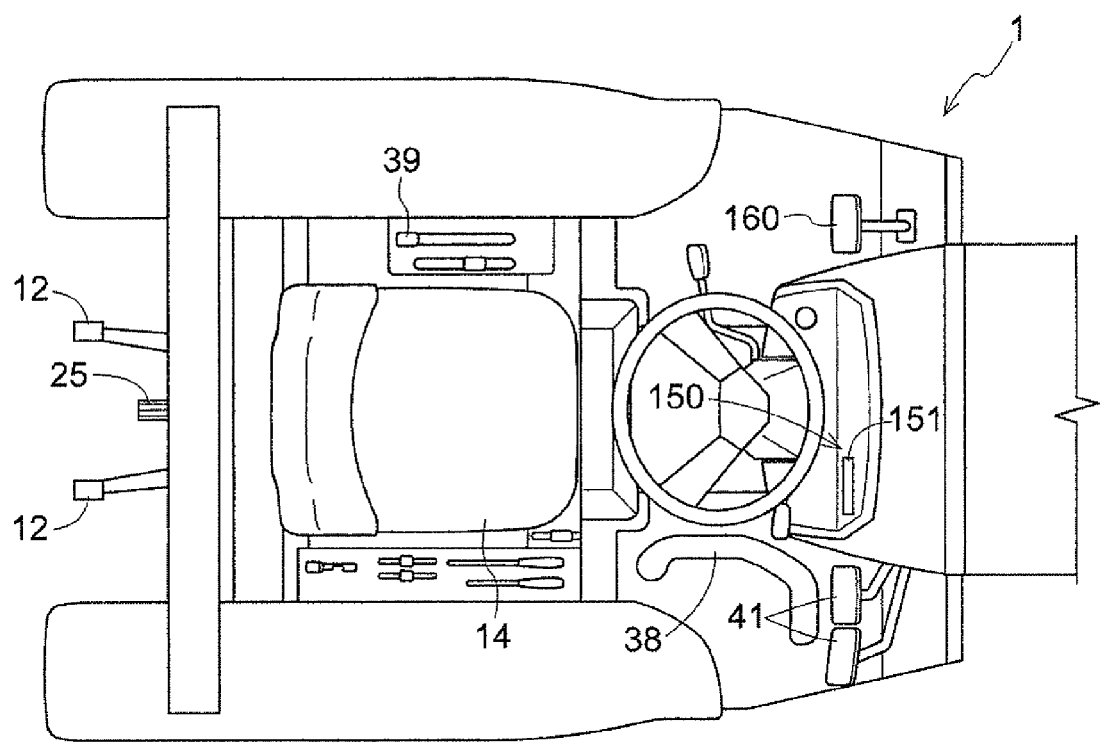
FIG. 11 is a plan view showing the arrangement of the side brake pedals and stop operation pedal of the second embodiment.
Figure 12:
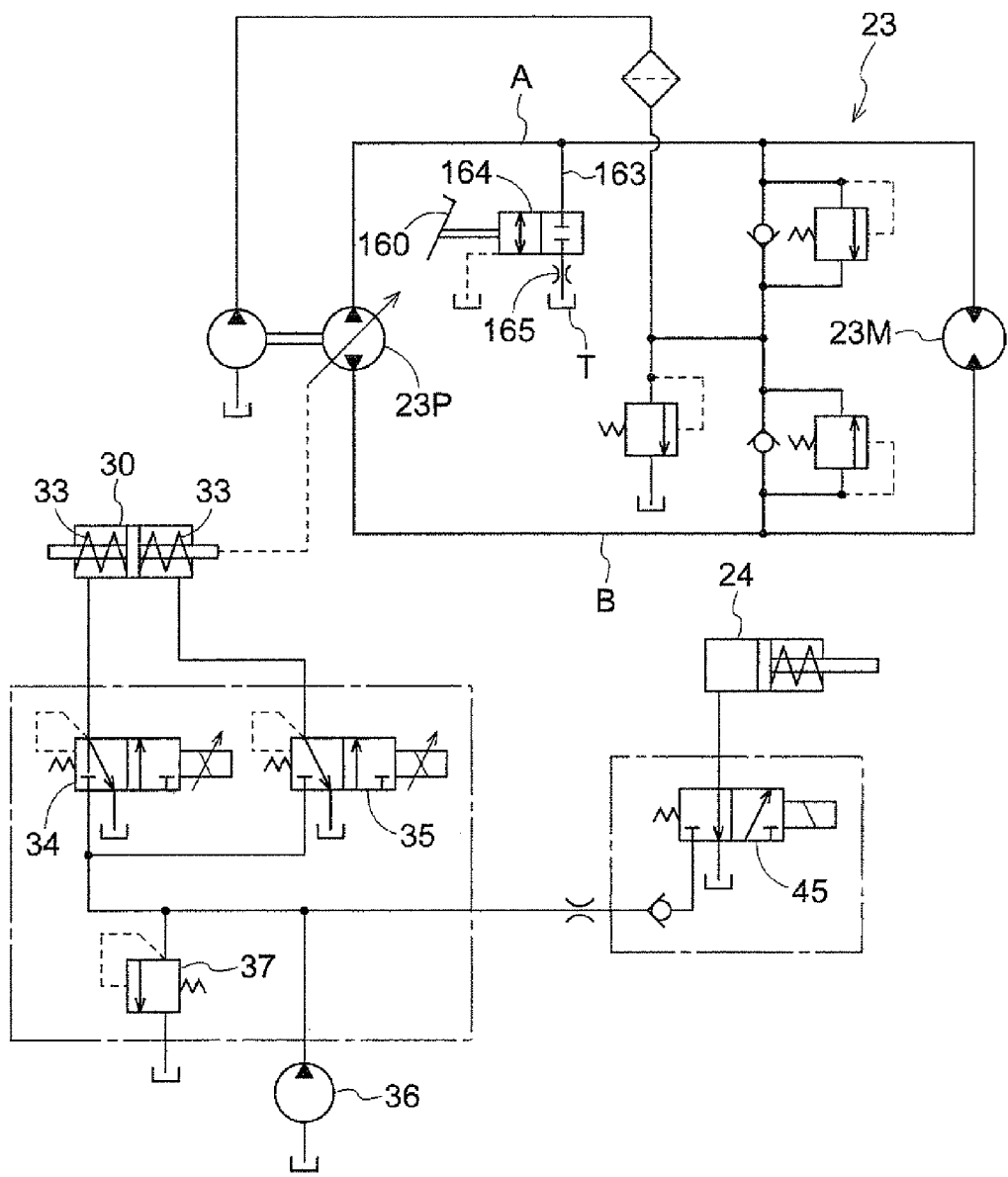
FIG. 12 is a hydraulic circuit diagram of the hydro static transmission of the second embodiment.

FIG. 9 shows a tractor configured with a rotary tiller design, which is an example of a work vehicle comprising the transmission device according to the second embodiment of the present invention.

A hydro static transmission 23, comprising a first oil passage A which has high pressure during forward travel and a second oil passage B which has low pressure during forward travel, is provided with a stop operation pedal 160 as a stop operation tool for releasing the oil pressure of the first oil passage A, which is a drive circuit of the continuously variable transmission 23, and blocking the transmission of power to the travel device, as shown in FIGS. 9, 10, 11, and 12.

Specifically, the continuously variable transmission 23 is provided with a return oil passage 163 spanning between an oil tank T and the first oil passage A that has high pressure during forward travel; the return oil passage 163 is provided with an unloading valve 164; and a throttle valve 165 is provided between the unloading valve 164 and the oil tank T in the return oil passage 163. The stop operation pedal 160 is configured so that the oil pressure of the first oil passage A of the continuously variable transmission 23 is released by the unloading valve 164, and the transmission of power to the travel device is blocked.

A detection switch 161 is provided for detecting the state in which power transmission is blocked by the pressing of the stop operation pedal 160, and a detection signal of this detection switch 161 is transmitted to the control device 32. The control device 32 is configured so that second PTO pressure controller 102 is provided for operating the proportional control valve 45 on the basis of whether or not the stop operation pedal 160 has been detected as being pressed by the detection switch 161, and the second PTO pressure controller 102 controls the clutch pressure of the PTO clutch 24 in accompaniment with the pressing of the stop operation pedal 160.

With the second PTO pressure controller 102, the stop operation pedal 160 is determined to be pressed when the detection switch 161 for detecting between the two states of engaged or disengaged reads as engaged, and the stop operation pedal 160 is determined to be released from pressing when the detection switch 161 reads as disengaged.

With the second PTO pressure controller 102, when the detection switch 161 is switched from disengaged to engaged, a control command is outputted to the proportional control valve 45 so that control is performed equivalent to the control carried out in the period from the return position (a) to the second pressed position (c) in the PTO pressure control curve shown in FIG. 5.

Conversely, when the detection switch 161 is switched from engaged to disengaged, a control command is outputted to the proportional control valve 45 so that control is performed equivalent to the control carried out in the period from the second pressed position (c) to the return position (a) in the PTO pressure control curve shown in FIG. 5.

At this time, with the detection switch 161 for detecting the state of blocked power transmission by the stop operation pedal 160, it is not possible to detect information equivalent to changes in the amount by which the previously described brake pedals 41 are pressed in the period from the return position (a) to the second pressed position (c). Instead, the second PTO pressure controller 102 is configured so that generally a time period equivalent to the interval from the start of braking to the stopping of the vehicle body is stored in the control device 32 as a preset time period, and the clutch pressure from the return position (a) to the second pressed position (c) is adjusted during the set time period.

With the second PTO pressure controller 102, the positions in the returning of the stop operation pedal 160 that are equivalent to the first pressed position (b) and the nearly returned position (a') set between the return position (a) and the second pressed position (c) in FIG. 5 are also set so that the ratio of the time period from the second pressed position (c) to the first pressed position (b) in relation to the set time period, as well as the ratio of the time period from the second pressed position (c) to the nearly returned position (a'), are similar to the ratio between the operation stroke of the brake pedals 41 between the return position (a) and the second pressed position (c), on the one hand, and either the operation stroke of the brake pedals 41 from the second pressed position (c) to the first pressed position (b) or the operation stroke of the brake pedals 41 from the second pressed position (c) to the nearly returned position (a'), on the other hand.

The second PTO pressure controller 102 and the PTO pressure controller 101 are configured so that either one is selected to control the proportional control valve 45, and the proportional control valve 45 is controlled by the PTO pressure controller 101 in a state in which the brake pedals 41 have been operated and the turning angle of the operative arm 43 has been detected by the potentiometer 44.

Therefore, the PTO clutch pressure is preferably controlled by the PTO pressure controller 101 in a state in which the proportional control valve 45 is thus controlled by the PTO pressure controller 101, and this is done even if the detection switch 161 detects that the stop operation pedal 160 has been pressed. Even if the detection switch 161 first detects that the stop operation pedal 160 has been pressed and the PTO clutch pressure is controlled by the second PTO pressure controller 102, control by the second PTO pressure controller 102 is stopped and control by the PTO pressure controller 101 is given priority when the brake pedals 41 are operated and a detection signal from the potentiometer 44 is sent to the PTO pressure controller 101.

Figure 13:
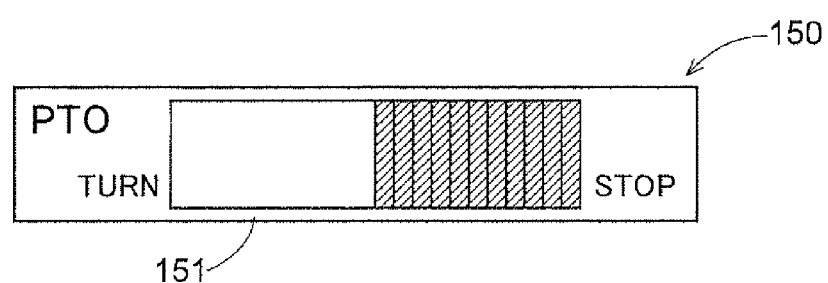
FIG. 13 is an explanatory drawing of a display screen for displaying changes in the PTO clutch pressure.

FIG. 13 is an explanatory drawing of a display screen 151 as display means for displaying changes in the PTO clutch pressure, wherein the pressure changes are displayed on a meter display 150 provided to the steering panel portion of the tractor. The display is configured so that the extent of increase or decrease in PTO clutch pressure can be displayed as an image in bar graph form from the "stop" position on the right side of the drawing to the "turn" position on the left side.

The display screen 151 is controlled by display controller 103 for outputting a display signal to the meter display 150 on the basis of a detection signal from the potentiometer 44 so that a display is shown while the brake pedals 41 are returning from the second pressed position (c) to the return position (a).

The display signal from the display controller 103 may be designed so that the clutch pressure of the PTO clutch 24 is directly detected and displayed, but the display controller 103 is configured so that a display signal is outputted in a manner in which a value converted from the detection results of the operation stroke of the brake pedals 41 is displayed as the PTO clutch pressure, and the display screen 151 is displayed in interruption mode over a predetermined location of the meter display 150 on the basis of the detection signal of the potentiometer 44, assuming that the operation stroke of the brake pedals 41 and the PTO clutch pressure correspond to each other.

Additional Embodiment 1

In the embodiments described above, the clutch pressure of the PTO clutch 24 does not substantially change up until immediately before the second pressed position (c) when the brake pedals 41 are operated as braking operation tools in the pressed direction, as shown in FIG. 5, and the clutch-engaged state is maintained without a semi-clutch state. When the brake pedals are pressed past the first pressed position (b), which is a position at which traveling stops, to the second pressed position (c), control is performed so that the clutch pressure of the PTO clutch 24 is rapidly reduced and a clutch-disengaged state is achieved. The PTO clutch 24 is changed so that the clutch pressure gradually increases in a semi-clutch state while the brake pedals 41 are returning from the first pressed position (b) to the nearly returned position (a') when the brake pedals 41 are operating in the press-releasing direction.

However, the present invention is not limited to control being performed so that the clutch pressure always changes in this manner. It is possible, for example, to make appropriate changes and perform control so that the clutch pressure of the PTO clutch 24 is changed gently changed from slightly before the second pressed position (c), and the clutch is completely disengaged at the point in time when the second pressing position (c) is reached the brake pedals 41 are being operated in the pressing direction during operation of the two brake pedals 41 in the pressing direction.

In other words, hysteresis may occur in the control characteristics between the pressing direction and press-releasing direction of the brake pedals 41 so that the degree of change in the PTO clutch pressure when the brake pedals 41 are operated as braking operation tools in the pressing direction results in a more sudden change than the rate of change in PTO clutch pressure when the brake pedals 41 are operated in the press-releasing direction, making it possible to reduce the degree of wear of the PTO clutch 24 while an advantage is utilized whereby the braking operation and the change in PTO clutch pressure are correlated with each other, good operability is achieved, and tillage residue is reduced.

Additional Embodiment 2

The braking operation tools are not limited to a pair of left and right side brake pedals 41, and may also be brake pedals designated solely for braking. Nor are the tools limited to pedals, and the tools may be operative levers or the like for braking.

Additional Embodiment 3

The display screen 151 displayed on the meter display 150 is not limited to a screen that can display the rate of increase or decrease in PTO clutch pressure as an image. For example, the pressed mount of the brake pedals 41 may be displayed, or the engaging and disengaging of the linked state changeover switch 48 for changing the linked state between the PTO clutch 24 and the left and right side brakes 22 may be displayed.

The configuration may also be designed so that when the rate of increase or decrease in the PTO clutch pressure is displayed, the rate of increase or decrease is displayed instead of sporadic pressure fluctuations when a predetermined pressure continues for at least predetermined period of time.

What is claimed is:

1. A transmission device for a work vehicle, comprising:
a travel drive system for transmitting engine power to a travel device;
an implement drive system for transmitting engine power to an external power take-off shaft;
braking operation tools for a braking operation;
a stop operation mechanism provided to the travel drive system and capable of interrupting the transmission of power to the travel device; and
a hydraulically operated PTO clutch for interrupting the transmission of power to the external power take-off shaft, the PTO shaft being provided to the implement drive system;
wherein the stop operation mechanism and the PTO clutch are linked with the braking operation tools so that the stop operation mechanism is operated to a power transmission stopping position and the PTO clutch is disengaged along with a pressing operation of the braking operation tools, and the PTO clutch is engaged along with a press-releasing operation of the braking operation tools; and
wherein an operation timing is set so that the PTO clutch is disengaged after traveling is detected to have stopped when the braking operation tools are operated in the pressing direction, and that the PTO clutch is engaged before traveling is started when the braking operation tools are operated in the press-releasing direction.

2. The transmission device of claim 1, wherein
a changeover switch capable of interrupting the link between the braking operation tools and the PTO clutch is provided.

3. The transmission device of claim 1, wherein
a PTO shaft sensor for detecting the rotation of the external power take-off shaft is provided, and the operation of the stop operation mechanism and the PTO clutch is linked with the braking operation tools only when the external power take-off shaft is rotating.

4. The transmission device of claim 1, wherein
a PTO clutch sensor for detecting the connected state of the PTO clutch is provided, and the operation of the stop operation mechanism and the PTO clutch is linked with the braking operation tools only when the PTO clutch is in the engaged state.

5. The transmission device of claim 1, wherein
a forward travel detection sensor for detecting a forward traveling state is provided, and the operation of the stop operation mechanism and the PTO clutch is linked with the braking operation tools only during a forward traveling state.

6. A transmission device for a work vehicle, comprising:
a travel drive system for transmitting engine power to a travel device;
an implement drive system for transmitting engine power to an external power take-off shaft;
braking operation tools for a braking operation;
a stop operation mechanism provided to the travel drive system and capable of interrupting the transmission of power to the travel device; and
a hydraulically operated PTO clutch for interrupting the transmission of power to the external power take-off shaft, the PTO shaft being provided to the implement drive system;
wherein the stop operation mechanism and the PTO clutch are linked with the braking operation tools so that the stop operation mechanism is operated to a power transmission stopping position and the PTO clutch is disengaged along with a pressing operation of the braking operation tools, and the PTO clutch is engaged along with a press-releasing operation of the braking operation tools; and
wherein an operation timing is set so that the PTO clutch is disengaged after the stop operation mechanism has been operated to the power transmission stopping position and a predetermined time period has elapsed when the braking operation tools are operated in the pressing direction, and that the state in which power transmission is stopped by the stop operation mechanism is released after engaging of the PTO clutch is started and a predetermined time period has elapsed when the braking operation tools are operated in the press-releasing direction.

7. The transmission device of claim 6, wherein
a changeover switch capable of interrupting the link between the braking operation tools and the PTO clutch is provided.

8. The transmission device of claim 6, wherein
a PTO shaft sensor for detecting the rotation of the external power take-off shaft is provided, and the operation of the stop operation mechanism and the PTO clutch is linked with the braking operation tools only when the external power take-off shaft is rotating.

9. The transmission device of claim 6, wherein
a PTO clutch sensor for detecting the connected state of the PTO clutch is provided, and the operation of the stop operation mechanism and the PTO clutch is linked with the braking operation tools only when the PTO clutch is in the engaged state.

10. The transmission device of claim 6, wherein
a forward travel detection sensor for detecting a forward traveling state is provided, and the operation of the stop operation mechanism and the PTO clutch is linked with the braking operation tools only during a forward traveling state.

11. A transmission device for a work vehicle, comprising:
a travel drive system for transmitting engine power to a travel device;
an implement drive system for transmitting engine power to an external power take-off shaft;
braking operation tools for applying braking action to the traveling of a vehicle body; and
a hydraulically operated PTO clutch for interrupting the transmission of power to the external power take-off shaft, the PTO shaft being provided to the implement drive system;
wherein the PTO clutch and the braking operation tools are linked so that the clutch pressure of the PTO clutch is changed and the clutch is disengaged along with an increase in the amount by which the braking operation tools are operated in the travel-stopping direction, and the clutch pressure is changed and the clutch is engaged along with a decrease in the amount operated in the travel-stopping direction; an operation timing is set between the braking operation tools and the PTO clutch so that the PTO clutch is disengaged after the braking operation of the braking operation tools has been started by operating the braking operation tools in the travel-stopping direction, and the PTO clutch starts to be engaged before the braking operation of the braking operation tools is released by operating the braking operation tools in the travel stop releasing direction; and
wherein controller is also provided for performing control so that the change in the clutch pressure of the PTO clutch relative to the operated amount of the braking operation tools is less at the clutch engagement side than at the clutch disengagement side.

12. The transmission device of claim 11, wherein
the end position of the engaging operation of the PTO clutch, which accompanies the operation of the braking operation tools toward a travel stop release, is set toward the start of the travel stop releasing operation and away from the position in the operation stroke of the braking operation tools where the travel stop releasing operation of the braking operation tools ends.

13. The transmission device of claim 11, wherein
the position where the PTO clutch starts to disengage in accompaniment with the operation of the braking operation tools in the travel-stopping direction is set toward the end of the travel-stopping operation of the braking operation tools and away from the position in the operation stroke of the braking operation tools where the PTO clutch starts to engage in accompaniment with the operation of the braking operation tools in the travel stop releasing direction.

14. The transmission device of claim 11, wherein
display means is provided for displaying the change in PTO clutch pressure accompanying the operation of the braking operation tools in the stop-releasing direction.

15. The transmission device of claim 11, wherein
a changeover switch capable of interrupting the link between the braking operation tools and the PTO clutch is provided.

* * * * *